Dec. 22, 1953 H. OGARD 2,663,194
ARTICULATED FRICTION V BELT AND BELT SECTION
Filed May 26, 1948

INVENTOR
Helmer Ogard
BY
Carlson, Pitzner, Hubbard & Wolfe
Attys.

Patented Dec. 22, 1953

2,663,194

UNITED STATES PATENT OFFICE 2,663,194

ARTICULATED FRICTION V BELT AND BELT SECTION

Helmer Ogard, Chicago, Ill., assignor to Armstrong-Bray & Co., Chicago, Ill., a corporation of Illinois Application May 26, 1948, Serial No. 29,309

6 Claims. (Cl. 74—236)

The present invention pertains to belts of the so-called V-type having tapering side walls which frictionally engage complemental walls on driving and driven pulleys or sheaves, and more particularly to such belts composed of detachably connected sections.

An object of the invention is to provide an improved V-belt of the aforesaid character in which the individual sections are constructed in a novel manner to facilitate assembling of the same and to provide increased durability.

A more specific object resides in the provision of belt sections which by reason of their unitary construction facilitate assembly of the belt and eliminate the necessity for the handling, storage, and the like of a multiplicity of separate parts as has heretofore been required.

Other objects and advantages of the invention will become apparent from the following detailed description of the preferred embodiment illustrated in the accompanying drawings, in which.

Figure 1:
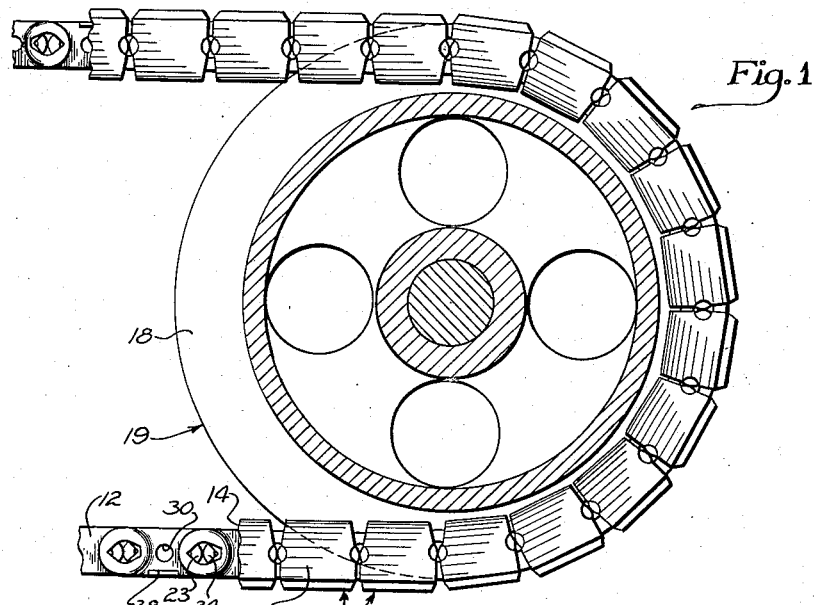
Figure 1 is a fragmentary elevational view of a V-belt embodying the present invention, one belt pulley being shown in section.
Figures 2, 3:
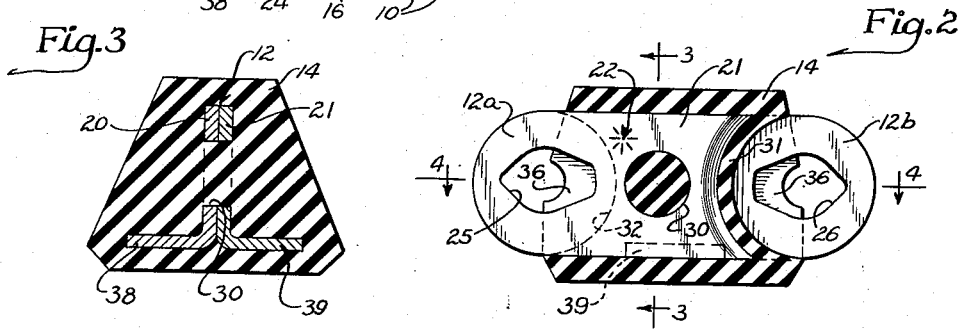
Fig. 2 is a vertical longitudinal section on an enlarged scale through an individual belt section.
Fig. 3 is a vertical transverse section taken substantially in the plane of line 3—3 in Fig. 2.
Figure 5:
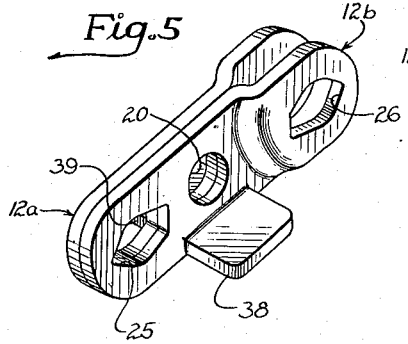
Fig. 5 is a perspective view of one of the link members.
Figure 4:
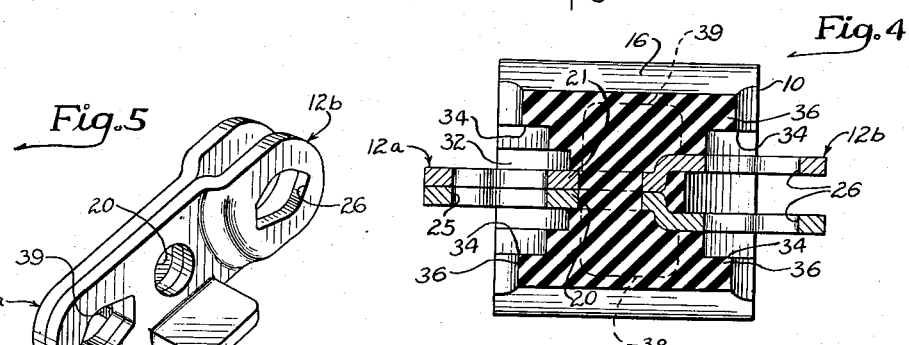
Fig. 4 is a transverse longitudinal section taken substantially in the plane of line 4—4 in Fig. 2.

The improved belt as illustrated in the drawings comprises generally a plurality of detachably connected sections 10, each of which includes a link member 12 and a block 14. The link members 12 are of nonextensible material and are interconnected in end-to-end relation with like members of succeeding sections 10 to form an endless, flexible, nonextensible chain. The blocks 14 are of friction material and have side walls 16 which taper and converge toward each other so as to fit into a V-groove defined by spaced peripheral walls 18 of a pulley or sheave 19. In passing around the pulley, the blocks 14 become compressed between the walls 18 with sufficient force to transmit torque without substantial slippage.

Preferably, the link members 12 are fashioned from sheet material, and to this end each comprises a pair of complemental strap or plate elements 20 and 21 secured together as by spot welding at 22. One end of each link element is offset outwardly and when the elements are placed together in back-to-back relation, such ends will be spaced apart. Thus, each of the link members 12 has a flat end 12a and a forked or bifurcated end 12b to receive the flat end 12a of the adjacent link member of the succeeding belt section 10.

Pivotal connection between adjoining belt sections 10 is provided by means of pins 23 and 24 received in registering apertures 25 and 26 in the interfitting ends of the links 12. In the present instance, the pins 23 and 24 are of the rocker type, and each is of generally segmental cross section and of a length sufficient to project laterally a short distance beyond the outer side surfaces of the bifurcated link end 12b. The apertures 25 and 26 are of elongated form, and adjacent their outer end margins each is fashioned to receive one of the pins 23 or 24 in a manner to prevent relative rotational movement thereof. The inner marginal edge of each aperture is fashioned to provide clearance to permit rotational movement of the other pin 24 or 23. As shown, the pin 23 is seated in the aperture 25 and faces toward the right, and the pin 24 is seated in the apertures 26 and faces to the left. When belt tension is applied, the adjacent oppositely disposed faces of the pins are maintained in engagement and constitute arcuate bearing surfaces for one to roll upon the other as the belt is flexed. Thus joint friction is substantially reduced, and substantially all wear on the connecting means incident to the flexing of the belt is borne by the contacting faces of the rocker pins 23 and 24.

In carrying out the invention, each link member 12 and block 14 are constructed to provide a belt section 10 of a unitary character. To this end, the block 14 is bonded to the link member 12, and in addition has portions interlocking therewith. Preferably, the block 14 is of a friction material, such as rubber or rubber composition, which is integrally formed about the link member 12, enveloping the intermediate portion thereof, in a pressure molding and curing operation, thereby obtaining an exact interfit and a strong rubber-to-metal bond. The material of the block 14 also is molded into a central aperture 30 in the link member 12, and partially between the diverging portions of the elements 20 and 21 at 31, thereby providing a strong interlock to resist relative displacement of the parts.

To provide clearance in each belt section 10 for the bifurcated end 12b of the link member 12 of the adjoining section, the block 14 is formed with generally semi-circular recesses 32 at opposite sides of the flat link end 12a. Likewise, recesses 34 are formed in opposite ends of the block 14 in registration with the apertures 25 and 26 to receive and accommodate the rocking movements of the projecting ends of the pins 23 and 24. The outer end edges of the block 14 are extended so as to provide yieldable shoulders 36 which overlie the ends of the pins 23 and 24 and serve to constrain them normally against longitudinal displacement. It is necessary only to deform or displace the shoulders 36 when the pins are to be inserted or withdrawn in the assembly or disassembly of the belt sections.

Pull on the belt when in use tends to cause relative longitudinal displacement between the block 14 and the link 12, and heretofore means, such as buttress plates and end washers, have been employed to resist this tendency. In the present construction with the block-to-link bond, and the interfitting engagement of the block with the link member, and the reception of the pins 23 and 24 in the block recesses 34, such displacement is effectively prevented without the necessity for such additional buttress parts, thereby resulting in a simplified construction, reduced cost and ease of assembly.

To provide increased strength both to resist longitudinal displacement and particularly to avoid any likelihood of the link member 12 pulling laterally out of the block 14 when subjected to strain in movement about the pulleys, the link member is provided with laterally extending flanges or wings 38 and 39. In the present instance the wings 38 and 39 are in the form of tabs integral with and bent outwardly from the link elements 20 and 21 respectively, intermediate their ends and on the outer top edges thereof. Thus the wings 38 and 39 are disposed in the outer or top part of the block 14 where there is more stock to receive them.

From the foregoing therefore, it can be seen that the assembly of a V-belt from sections constructed in accordance with the present invention is facilitated, the necessity for handling, storage and so forth of a multiplicity of separate parts has been eliminated, and a belt of increased durability results. Additionally because of unitary character of the sections the number of separate manufacturing operations is materially reduced with the consequent saving in cost.

I claim as my invention:

1. A V-belt section for connection with other like sections to form an articulated belt, said section comprising a link member and an integral block of friction material, said link member having an opening therein, and said block enveloping the intermediate portion of said link and having portions interfitting with said link and in said opening, and said block portions and said link being bonded together.

2. In a V-belt including a plurality of detachably connected sections each section comprising, in combination, a pair of complemental strap elements secured together in back-to-back relation to form a link having a flat end and a bifurcated end to receive the flat end of an adjoining link of a succeeding section, each of said ends having an aperture therein for the reception of connecting pins, and a block of friction material disposed intermediate the ends of said link and having recesses therein adjacent the flat end of the link to receive the bifurcated end of the adjoining link of the succeeding belt section and also having recesses therein adjacent said link apertures to accommodate said pins, said block further having shoulders thereon to overlie said pins to retain the same in said apertures against accidental longitudinal displacement.

3. A V-belt section for connection with like sections to form an articulated belt, said section comprising a link having an opening therein and an integral block of friction material enveloping the intermediate portion of said link, said block and said link being bonded together, and means preventing relative displacement between said block and said link, said means including portions of said block interlocking with said link and in said opening.

4. A V-belt section for connection with like sections to form an articulated belt, said section comprising a link having an opening therein and a block of friction material, said block and said link being bonded together, and means preventing relative displacement between said block and said link, said means including flanges on said link molded into said block and portions of said block interlocking with said link and in said opening.

5. A V-belt section for connection with other like sections to form an articulated belt, said section comprising a link including a pair of complemental strap elements secured together in back-to-back relation, one end of each element being offset outwardly whereby said link has a flat end and a forked end, said link having an aperture therein intermediate its ends, and a block of friction material bonded to said link, said block having portions disposed in said aperture and between said link elements at the point where said elements diverge.

6. In a V-belt including a plurality of detachably connected sections, each section comprising, in combination, a block of friction material, a link member bonded within said block and having a flat end and a bifurcated end to receive the flat end of an adjoining link of a succeeding section, each of said link ends having an aperture therein adapted to register with a similar aperture in the succeeding link, a pair of pins received in each of said apertures and serving to join succeeding belt sections, said pins having arcuate surfaces rolling one upon the other as the belt is flexed, said pins and apertures being fashioned to prevent relative rotational movement between the pins and the link, and said block having shoulders thereon overlying the ends of the pins to retain the same against longitudinal displacement in said apertures.

HELMER OGARD.

References Cited in the file of this patent
UNITED STATES PATENTS

| Number | Name | Date |
|---|---|---|
| 921,095 | Dukelow | May 11, 1909 |
| 1,113,536 | Bohlman | Oct. 13, 1914 |
| 1,201,736 | Howe | Oct. 17, 1916 |
| 1,940,297 | Diamond | Dec. 19, 1933 |
| 2,390,542 | Knox | Dec. 11, 1945 |
| 2,403,607 | Ogard | July 9, 1946 |